Dec. 22, 1959     E. D. DALL     2,917,916
DECK LATCH STRUCTURE

Filed Jan. 7, 1955     3 Sheets-Sheet 1

INVENTOR.
EDWARD D. DALL
ATTORNEY

Dec. 22, 1959     E. D. DALL     2,917,916
DECK LATCH STRUCTURE
Filed Jan. 7, 1955     3 Sheets-Sheet 3

INVENTOR.
EDWARD D. DALL
ATTORNEY

2,917,916
DECK LATCH STRUCTURE

Edward D. Dall, Birmingham, Mich., assignor to Atwood Vacuum Machine Company, Rockford, Ill., a corporation of Illinois Application January 7, 1955, Serial No. 480,337

10 Claims. (Cl. 70—156)

This invention relates to a latch structure which, while especially designed and adapted for use as a deck latch for application to rear trunk lids for motor vehicles, is not limited to that one use.

The principal object of my invention is to provide a simple and practical as well as economical structure of the kind mentioned and one which is thoroughly dependable in its operation and permits the lid to be closed in either the locked or unlocked position of the latching lever, it being understood that said lever is connected with a crank pin on the end of the rotatable barrel of a rotary type key-operated lock for locking purposes.

A salient feature of the present latch structure is the provision of an inclined slot in the latch lever intermediate the ends thereof for its sliding pivotal support, the angularity of this slot being such that the hooked end of the latch, when actuated by contact with the keeper, is caused to move always in a substantially straight horizontal line and hence, assuming that the lid is not closed tightly enough at the outset to permit the hooked end to take full hold of the keeper, the lid will, nevertheless, be securely locked and the hooked end will drift ultimately into full engagement with the keeper when the car is in motion.

The invention is illustrated in the accompanying drawing, in which—

The same reference numerals are applied to corresponding parts throughout the views.

Figure 1:
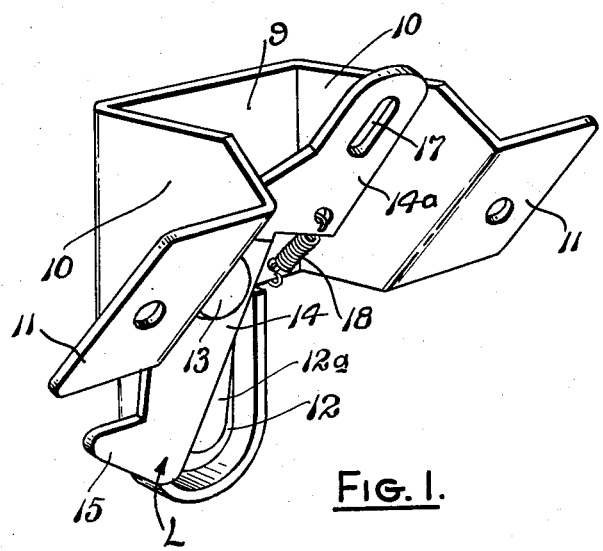
Fig. 1 is a perspective view of the latching lever and its supporting bracket which, as a unit, is installed within the lower edge portion of the rear trunk lid on a motor vehicle.
Figure 2:
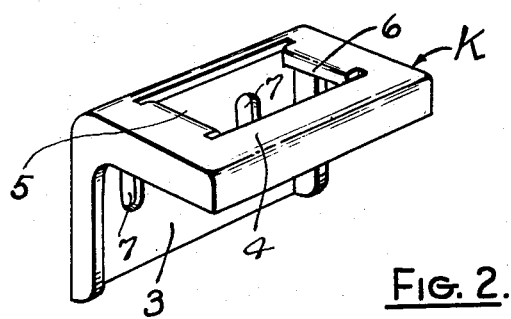
Fig. 2 is a perspective view of the keeper with which the hooked end of the latching lever cooperates, the keeper being mounted in the trunk or luggage compartment of the motor vehicle.

Referring to the drawings, the reference numeral 1 designates the rear wall of the trunk or luggage compartment of a motor vehicle and 2 the lid which is suitably hingedly mounted at its upper end in the usual way to swing up and down to and from the open position in which access is permitted to the interior of the trunk. The keeper indicated at K is an L-shaped sheet metal stamping providing a vertical leg 3 and a horizontal leg 4 reinforced by integral flanges formed on the edges thereof, as shown. Leg 4 has a rectangular opening 5 provided therein at the ends of which portions of the metal are bent downwardly, as indicated at 6. Spaced vertical vertical slots 7 in the vertical leg 3 permit adjustably mounting the keeper on the back wall of the trunk as by means of bolts 8. With this construction it is evident that the keeper K may be adjusted up or down to any desired position to cooperate properly with the latch mechanism L carried on the lid 2.

Figure 3:
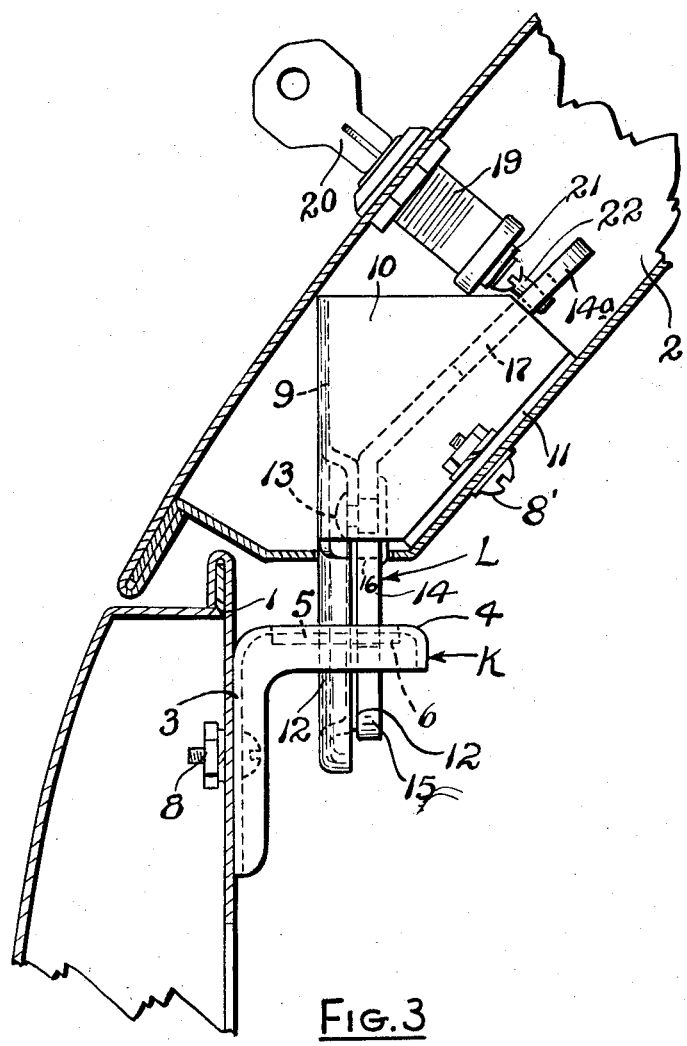
Fig. 3 is a vertical section through a portion of the trunk and lid showing in side elevation the latch structure of my invention.

As appears in Fig. 1, the latch mechanism L comprises a generally channel-shaped bracket having a vertical web portion 9 and substantially parallel vertical side flanges 10, the latter terminating in outwardly bent ears 11 which have abutment with the inner wall of the lid 2 and are fastened thereto by bolts 8', as shown in Fig. 3. The web 9 is continued downwardly below the flanges 10 to provide a pilot extension 12 of generally rectangular form but rounded at its lower end, the lower end and the vertical sides being defined by reinforcing inwardly bent flanges, as shown. This pilot extension 12 reaches to a lower elevation than the hooked end of the latch and serves by sliding engagement with the flanges 6 on opposite ends of the keeper opening 5 to guide the latch into said opening. The pilot extension 12 has the middle portion thereof embossed inwardly to provide a narrow elongated flat vertical bearing surface 12a for sliding bearing abutment by the lower or latch half of the latch lever 14 which is slidably pivotally mounted intermediate its ends on a rivet or pin 13 located at the upper end of the pilot extension 12 as shown. The lower end of the latch has a laterally extending keeper engaging hook or dog 15, the upper edge of which is substantially horizontal and adapted to engage under one of the flanges 6 on the keeper when the lid is in closed position. The upper or actuated half of the latch lever is bent inwardly in relation to the vertical lower half, as indicated at 14a, and this portion extends beyond the upper end of the supporting bracket to the extent most clearly indicated in Fig. 3. At this point special attention is called to the slot 16 provided in the lower or latch half of the latch lever 14 for reception of the rivet 13, the slot being inclined at an acute angle from the vertical. The upper end portion 14a of lever 14 has a vertical slot 17 provided therein for operative connection with the lock, as will soon appear. The latching lever 14 has one end of a coiled tension spring 18 connected thereto, the other end being connected to the web 9 of the bracket, and this spring tends normally to turn the lever in a clockwise direction, as viewed in Figs. 1, 4 and 5, and holds the lever to the left with pivot 13 engaging the right hand end of slot 16, as seen in Fig. 4.

Figures 4, 5:
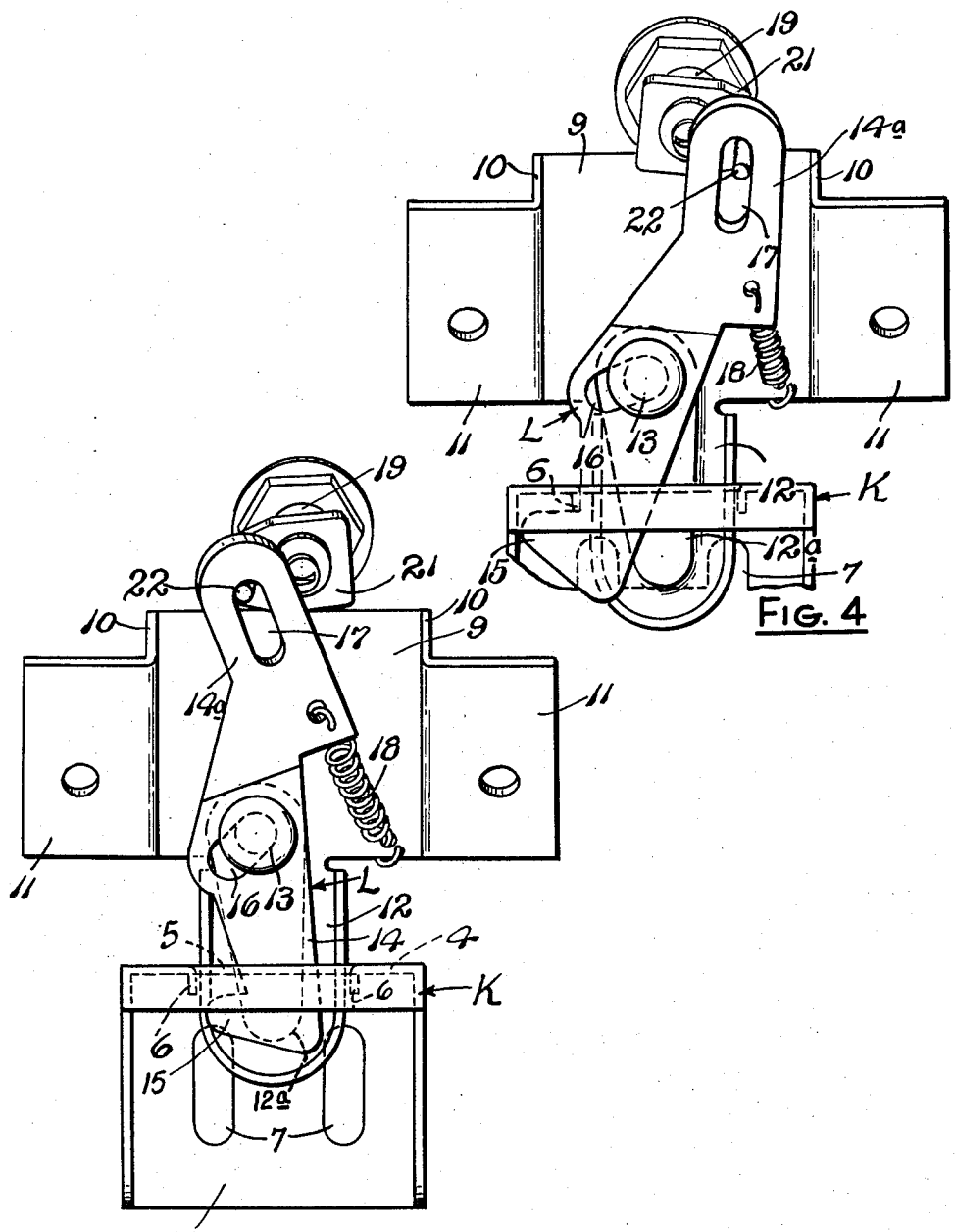
Figs. 4 and 5 are inside elevations of the latch structure shown in locked and unlocked position, respectively.

A lock is shown at 19 in Figs. 3, 4, and 5, the rotatable barrel of which is turned by means of a key 20 in the usual way, the key serving to operate tumblers inside the lock to free the barrel for rotation in the usual way. At the inner end of the barrel is a radial arm 21 fixed to turn with the barrel and having a crank pin 22 extending therefrom and received in the slot 17 in the latch lever. The arm 21 can be swung through 180° from the unlocked position of Fig. 5 to the locked position of Fig. 4, and vice versa. When the arm 21 is in the position of Fig. 5, the latch lever 14 has its hooked end 15 retracted with respect to the flange 6 and the lid 2 may accordingly be raised. On the other hand, when the arm 21 is in the position of Fig. 4, the hooked end 15 of latch lever 14 is engaged under the adjacent flange 6 locking the lid, and the lid cannot be raised until the proper key 20 has been entered into the lock 19 and turned through 180°.

In operation, the barrel of the lock 19 is turned by the key 20 from one dead center position through 180° to the other dead center position, and hence, the pin 22 holds the latch lever 14 definitely in either the open or closed position. However, although I have shown in Fig. 5 the fully retracted position of the hooked end 15 of the latch lever 14, it should be clear that because the end 15 extends to one side of the center of pivot 13, as soon as the operator turns the key 20 only part way from the locked position of Fig. 4 one may open the lid because upward thrust on the latch lever 14 results in pressure of the hooked end 15 against the flange 6 on the keeper K and the latch lever 14 accordingly swings in a counterclockwise direction with respect to pin 22 as a center against the action of spring 18, allowing the lid 2 to open. On the other hand, when the operator turns the key 20 to locked position before the lid is closed, no harm will be done because then pressure of the bottom of the hooked end 15 engaging the top of the keeper over flange 6 causes the latch lever 14 again to swing in a counterclockwise direction with respect to pin 22, as viewed in Figs. 4 and 5, against the action of spring 18 and the hooked end 15 will accordingly find its way through the opening 5 and under the flange 6. If it were not for the slot 16 in the lever 14 the hook 15 could not enter the keeper K, because it is clear that the pin 22 would otherwise prevent pivotal movement of the lever. In closing the lid, the inclined bottom edge of the end 15 of the lever 14 serves by sliding engagement with the keeper K on one side of the opening 5 to cam the lever in the right direction, it being clear that the pin 22 is held in locking position and the lever 14 has sliding movement at 16 relative to pin 13 and sliding pivotal movement at 17 relative to pin 22. The closeness of the hooked end 15 to pivot 13 in relation to the remoteness of pin 22 to the pivot 13 is advantageous because most of the pressure applied on the hook 15 is assumed by the pivot 13 and very little by pin 22. Now, it is important to note that not only does the inclination of the slot 16 allow the counterclockwise sliding pivotal movement of the latching lever 14 about the pin 22 as a center in the situations mentioned but its particular angle of inclination is such that as a result of the guiding action of pin 13 in slot 16 the hooked end 15 is caused to move not in an arc with the pin 22 as a center but in a substantially straight horizontal line, the latch lever 14 adjusting its position bodily in a vertical plane to do this, in its sliding pivotal movement on pin 22, the slight up and down shift in position caused at pin 13 being accommodated at pin 22 by slot 17. This horizontal straight line movement of the hooked end 15 of the latch is important because in the event the lid does not happen to be closed tight enough when it is locked and the hooked end 15 of the latch is only partially engaged under flange 6, there is no danger of the lid being forced open or opening accidentally; the hooked end 15 of the latch will drift into its fully engaged position under action of spring 18 ultimately when the car is in motion. The latch structure is of simple and economical construction, operates easily, and is always thoroughly dependable, and there are no parts liable to be worn prematurely or damaged and get out of order.

It is believed the foregoing description conveys a good understanding of the objects and advantages of my invention. The appended claims have been drawn to cover all legitimate modifications and adaptations.

I claim:

1. Mechanism of the class described comprising a generally vertical support, a spring actuated lever disposed substantially vertically in abutment with said support having a keeper engaging dog at its lower end and having a generally transversely extending slot provided therein between its ends, a guide pin carried by the support entered in said slot, the upper end portion of said lever having a substantially vertical slot provided therein, a key operated lock having a rotary barrel located adjacent the upper end portion of said lever, an arm secured to the lock barrel extending radially outwardly therefrom, and a pin at the outer end portion of said arm extending into said vertical slot in said lever.

2. Mechanism of the class described comprising a generally vertical support, a generally vertical lever disposed in abutment with said support, means including an inclined slot provided in the lever transversely thereof receiving a horizontal pin on the support for pivotally and slidably mounting said lever between its ends on said support, spring means connected with the lever normally urging it downwardly to engage the pin in the upper end of the slot, said lever at its lower end having a laterally extending keeper engaging dog provided with an upwardly inclined lower edge, said lever having another slot provided in the upper end portion thereof in longitudinally spaced relation to said inclined slot and extend in transversely with respect thereto, and a manually operating member having a pin entered in the last mentioned slot for a lost-motion operating connection with the upper end portion of said lever to oscillate said lever in a release direction against the action of said spring means while otherwise providing a sliding pivotal connection for the lever to bear against during keeper pressure against the inclined edge of the keeper engaging dog.

3. In combination, a door closure, a support secured to said closure, a spring actuated lever carried substantially vertically on said support, said lever between its ends having a slot provided therein having an acute angle inclination to a horizontal plane, a guide pin secured to said support entered in said slot, said lever at one end having a laterally extending keeper engaging dog with an inclined outer edge, a key operated lock mounted on said door closure adjacent the other end of the lever, lost-motion operating connections between said lock and lever for swinging said lever against its spring upon key operation of the lock to move the lever from its normal position to keeper releasing position and providing a sliding pivotal connection for the lever to bear against during keeper pressure against the said inclined edge of said dog.

4. In combination, a door closure, a latch lever support secured thereto adjacent a free edge thereof, a substantially vertically disposed spring actuated latch lever slidably pivotally mounted between its ends on said support for lateral movement bodily and having an end portion extending beyond the adjacent edge of said door closure and adapted to detachably engage with a keeper therefor beyond said adjacent edge of said closure, said lever at its outer end having a laterally extending keeper engaging dog, and a key operated lock mounted on said closure adjacent the other end of the lever, said lock including a manually rotatable part carrying a pin projection in radially spaced, parallel relationship to the axis of rotation of said part, said pin engaging in a slot provided in the adjacent end of said lever which extends in a transverse relationship to the direction of sliding pivotal movement of said lever about its slidable pivotal mounting, whereby to provide a lost-motion operating connection with the last mentioned end of said lever for oscillation thereof in a door releasing direction, while permitting sliding pivotal movement of said lever endwise and laterally upon engagement of said lever with the keeper in a door closing movement.

5. In combination, a door, a support secured thereto adjacent a free edge thereof, a substantially vertically disposed spring actuated lever slidably pivotally mounted between its ends on said support for lateral movement bodily and having an end portion extending beyond the adjacent edge of the door and adapted to detachably engage with a keeper therefor, said lever at said end portion thereof having a laterally extending keeper engaging dog, a manually operable member rotatably mounted on said door adjacent the opposite end portion of said lever, and a pin projecting from said manually rotatable member in parallel, radially spaced relation to the axis of rotation thereof and engaged in a slot provided in the adjacent end portion of said lever that extends in a direction transversely with respect to the direction of sliding movement of said lever about its slidable pivotal mounting, whereby to provide a lost-motion operating connection between the manually rotatable member and said lever to oscillate the lever in a release direction against spring action while permitting sliding pivotal movement of said lever laterally and endwise against spring action relative to said pin for engagement with the keeper in the closing of the door.

6. In combination, a door closure, a support secured to said closure, a substantially vertically disposed spring actuated lever carried on said support, said lever between its ends having a slot provided therein inclined at an acute angle with respect to a horizontal plane, a pin secured to the support passing through said slot permitting lateral movement of said lever bodily in its substantially vertical position, said lever at one end having a laterally extending keeper engaging dog with an outer edge at an acute angle to the length of said lever, a manually operable rotatable actuating member mounted on said door closure adjacent the other end of said lever, and a pin extending from said member in parallel, radially spaced relation to the axis of rotation thereof and engaged in a slot provided in the adjacent end of said lever, the slot being spaced from and in transverse relation to the first mentioned slot in said lever, said pin and slot providing a lost-motion operating connection between said member and the adjacent end of said lever to oscillate said lever against spring action in a release direction while permitting sliding pivotal movement of said lever with respect to said pin endwise and laterally during engagement with the keeper in a door closing movement.

7. In a latch structure, a support, an upright latching lever slidably pivoted intermediate its ends on said support allowing compound movement, namely, laterally and upwardly and return, the lower end of said lever having a keeper engaging projection extending laterally therefrom in one direction relative to said pivot, the upper end of said lever having a substantially vertical slot provided therein, a locking device including a pin entered in said last-mentioned slot completing a lost-motion operating connection with said lever permitting sliding pivotal movement of said lever relative to said locking device from one extreme position to another, one being the unlocked position and the other the locked position of said latch, and spring means urging the lever downwardly and to turn so as to engage the keeper-engaging-projection under the keeper.

8. Structure having the elements in combination defined in claim 7, said slidable pivotal mounting of the lever comprising a pivot pin fixed to said support, and a slot provided in said lever closed at both ends through which said pin passes, said slot being located generally transverse to the length of the lever and inclined at an acute angle relative to a horizontal plane permitting lateral movement of said lever bodily in its substantially vertical position.

9. A structure as set forth in claim 7, wherein the lower end of the lever and the lateral projection have the bottom edge inclined upwardly toward the end of the projection.

10. Structure having the elements in combination defined in claim 7, said slidable pivotal mounting of the lever comprising a pivot pin fixed to said support, and a slot provided in said lever closed at both ends through which said pin passes, said slot being located generally transverse to the length of the lever, the substantially vertical slot being so spaced in relation to said inclined slot, and the inclined slot having such inclination, that the keeper engaging projection in the sliding pivotal movement of the latching lever with respect to the pin on the locking device moves in a substantially straight horizontal line.

References Cited in the file of this patent

UNITED STATES PATENTS

| | | |
|---|---|---|
| 1,046,336 | Schatz | Dec. 3, 1912 |
| 1,095,569 | Glenn et al. | May 5, 1914 |
| 1,388,778 | Smith et al. | Aug. 23, 1921 |
| 1,573,866 | Rogers | Feb. 23, 1926 |
| 1,883,804 | Marque | Oct. 18, 1932 |
| 2,086,034 | Jacobi | July 6, 1937 |
| 2,246,781 | Dall | June 24, 1941 |
| 2,534,396 | Barnes | Dec. 19, 1950 |
| 2,658,778 | Dall | Nov. 10, 1953 |
| 2,700,885 | Dall | Feb. 1, 1955 |
| 2,703,727 | Vigmostad | Mar. 8, 1955 |

FOREIGN PATENTS

| | | |
|---|---|---|
| 908,097 | France | Aug. 13, 1945 |

UNITED STATES PATENT OFFICE

CERTIFICATE OF CORRECTION

Patent No. 2,917,916              December 22, 1959

Edward D. Dall

It is hereby certified that error appears in the printed specification of the above numbered patent requiring correction and that the said Letters Patent should read as corrected below.

Column 4, line 9, for "extend in" read -- extending --.

Signed and sealed this 26th day of July 1960.

(SEAL)
Attest:

KARL H. AXLINE                        ROBERT C. WATSON
Attesting Officer                      Commissioner of Patents